Feb. 10, 1970     L. R. HARRIS     3,495,211
STAINLESS STEEL DIAPHRAGM SONAR TRANSDUCER APPARATUS
Filed April 9, 1968
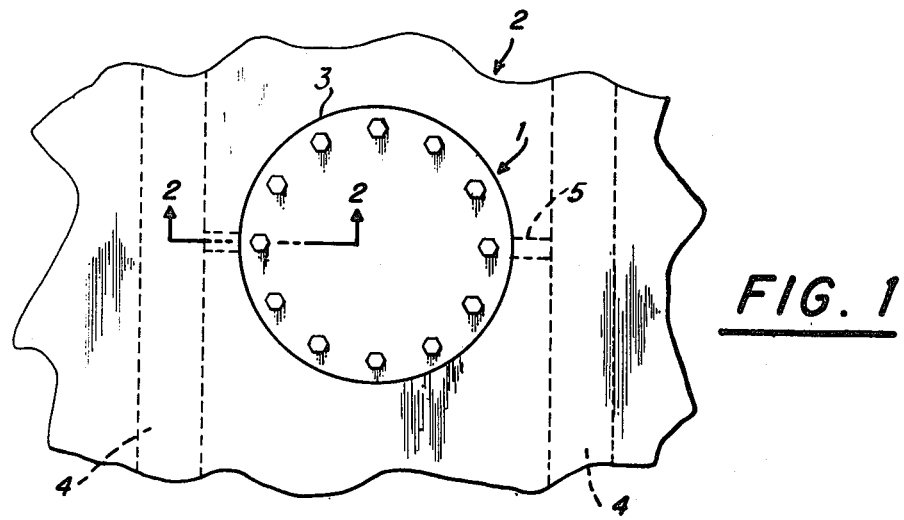
FIG. 1
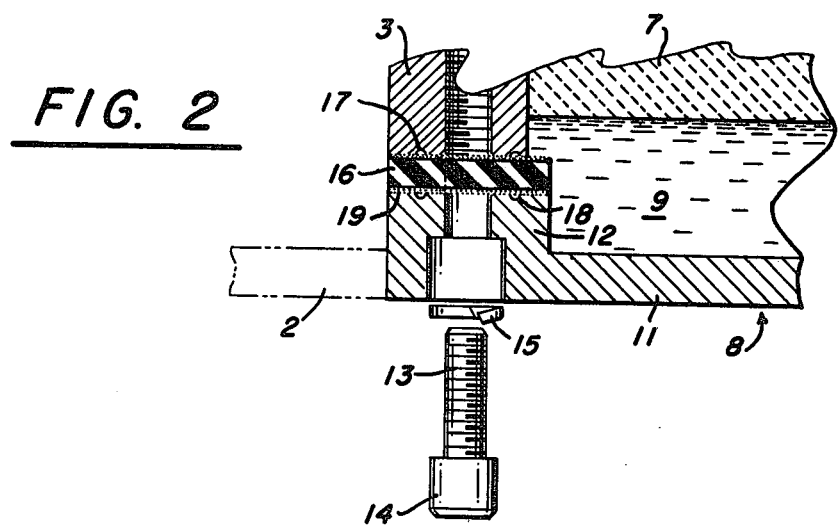
FIG. 2
INVENTOR.
LAMON R. HARRIS
BY
ATTORNEYS

United States Patent Office 3,495,211
Patented Feb. 10, 1970

3,495,211
STAINLESS STEEL DIAPHRAGM SONAR TRANSDUCER APPARATUS
Lamon R. Harris, Vallejo, Calif., assignor to the United States of America as represented by the Secretary of the Navy
Filed Apr. 9, 1968, Ser. No. 719,876
Int. Cl. H04b 13/00
U.S. Cl. 340—14                3 Claims

ABSTRACT OF THE DISCLOSURE

The sonar transducer is of a type adapted to be mounted in a casing secured in an opening formed in a ship hull. Its transducing diaphragm is a thin-wall stainless steel plate having a continuous peripheral flange portion extending at right angles to the plate and bolted to the open-end wall of the casing. The flange portion is sufficiently wide to provide metallic strength for the bolts and also of such length that the diaphragm, when secured, is flushly continuous with the skin surface of the hull. Also, the flange length is sufficient to provide an increased volumetric area between the driving elements of the transducer, such as ceramic crystals, and the diaphragm. A transducer fluid, such as oil, fills this area and the increased volume provides greater buffering to withstand shocks inherent in rough service conditions. Special means are provided to secure the diaphragm and provide the necessary water type seal.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Rough surface sonar transducers, such as the Navy's transducer types AT–200A/UQN–1 and TR–192A/UQN–1 customarily are carried in casings secured in an opening in the hull of a ship and the opening is covered by a rubber transducer diaphragm. The driving elements for the transducer are ceramic crystals and a transducer fluid, such as oil, is employed between the crystals and the rubber diaphragm to couple these members.

Such arrangements have presented a number of difficulties, one being that the rubber diaphragm is recessed with respect to the hull so as to produce an uneven skin surface that promotes turbulence and also provides edges to catch ice or other materials. Also, in the conventional arrangements, the spacing between the diaphragm and the crystals is relatively small so that the volume of the transducer fluid is correspondingly small and there is relatively little buffering protection for the crystals. Further, the manner in which prior diaphragms have been formed and secured to the casing results in a relatively weak assembly requiring frequent maintenance and repair.

OBJECT OF THE INVENTION

In view of the foregoing deficiencies, the principal objects of the present invention are to provide rough service sonar transducer apparatus of a type adapted to be mounted in an opening in a ship hull, the apparatus having improved strength, turbulence characteristics, sealing and bolting arrangements, as well as improved protection against shocks inherent in the rough service anticipated during use.

SUMMARY OF THE INVENTION

The driving elements of the sonar transducer are mounted in a casing carried in an opening provided in the ship hull, this casing being open-ended and adapted to be closed by a stainless steel, highly flexible, diaphragm member. The diaphragm is formed of a flat plate having a thickened peripheral flange portion projected inwardly at right angles, the flange portion mating with the open-end wall of the casing. The length of the flange is sufficient to dispose the diaphragm is a flush, continuous relationship with the skin of the hull and, as another requisite, the flange length is sufficient to provide an increased distance between the driving elements or crystals in the casing and the diaphragm.

To secure the flange to the casing, Allen-head types bolts having radially-enlarged cylindrically-shaped heads are employed. These and other features, such as special, water-tight sealing arrangement will be identified and described in the detailed description that is to follow.

BRIEF DESCRIPTION OF THE DRAWING

A preferred embodiment of the invention is illustrated in the accompanying drawings of which:

FIG. 1 is plan view showing a fragmentary portion of the ship hull and the manner in which the present sonar transducer apparatus is mounted and supported in the hull, and FIG. 2 is a partial section taken along lines 2—2 of FIG. 1.

DESCRIPTION OF THE PREFERRED EMBODIMENT

Referring to FIG. 1, the present sonar transducer apparatus, designated by numeral 1, is shown mounted in a ship hull 2, the apparatus being mounted in a tubular casing 3 supported between frames 4 of the ship by braces 5 welded thereto.

As already indicated, the transducer apparatus presently contemplated is generally known as rough service type UQN Sonar used by the U.S. Navy for a variety of purposes. Except for certain features to be described, a detailed understanding of the structure and operation of these transducers is not presently needed. Generally, they are relatively small units of about 11 inches in diameter and includes, as shown in FIG. 2, ceramic crystals or driving elements 7, a diaphragm member 8, and a transducer fluid 9 disposed in the space between the crystals and the diaphragm to couple these two members operatively in the manner well known in the transducer art. Thus, transducer fluid 9 transmits the expansion and contraction movements of the crystals to the diaphragm to project acoustic waves into the surrounding environment although, as also will be recognized, apparatus of this type also can be employed to convert acoustic waves to electrical signals, in which event the transducer fluid transmits the diaphragm movements to the crystals to produce the signals.

Important features of the present invention contemplate particularly the material and structure of diaphragm 8, as well as the special manner in which the diaphragm is secured to casing 3. Considering, by way of illustration, the manner in which the present inventive principles are applied to a particular sonar transducer type known as Type AT–200A/UQN–1, diaphragm 8 is a stainless steel member providing both corrosion resistance and strength, and the member is formed of a flat, thin-walled plate portion 11 having an inwardly extending circular flange portion 12 formed on the peripheral edges of the plate. Plate portion 11, of course, must be sufficiently flexible to act as a transducer diaphragm and, in the particular application being considered, the plate, which may have an over-all diameter of ten and three quarter inches, has a consistent wall thickness of $3/16$ of an inch, plus or minus .002 inch.

Flange 12 should be constructed with the specific dimensions to suit the application for which it is intended. In this regard, the flange must be of sufficient length so that, when a diaphragm is secured to the casing in a manner yet to be described, the outer surface of the diaphragm is precisely flush with the outer surface or skin of hull 2. When this flush or continuous disposition is achieved there are no recesses or sharp edges to catch ice, sea life, and other foreign objects which might produce damage to the diaphragm or initiate corrosion or fouling of the apparatus. Further, flange 12 must be of sufficient length to measurably increase the volume of the space occupied by transducer fluid 9 and the increase in this volume must be sufficient to permit the fluid to act as a bumper to withstand shocks. The increased volume provided by the increased spacing due to the length of flange 12 also decreases the possibility of the metallic cover shorting out against the crystals should the cover become concaved under shock or the result of collision. In the particular application presently being considered, the flange is approximately one-quarter of an inch in length which, when added to the 3/16 width of plate portion 11 provides an overall length of 7/16 inch. As will be appreciated, these dimensions may vary for other special transducer applications, although, under any circumstances, the requisites of flushness and of adequate buffering by the transducer fluid must be met.

The flanged, stainless steel cover not only has the functional advantages previously described but, in addition, the arrangement permits the diaphragm or cover to be secured to the casing in a special manner that improves the physical strength and sealing capacity of the coupling. Specifically, as shown in FIG. 2, the cover is secured to the casing by special Allen-head bolts formed with threaded shanks 13 and radially-enlarged cylindrically-shaped heads 14, both the casing and the cover, of course, being provided with drilled openings to receive the bolts, although, as shown, only the opening provided in the casing is threaded. A plurality of the Allen-head bolts are used and they each are secured in position by conventional lock washers 15.

A watertight seal is provided by a gasket-like member 16 disposed between the outer edge of the casing and the inner edge of flange 12. Most suitably, the gasket is formed of so-called dead rubber which is in rather common use in sonar applications and which also is known as red rubber. Further, to increase the seal and to assure better seating of the members, both the outer edge of the casing and the inner edge of flange 12 are formed with machined grooves 17 and 18, respectively, to receive the gasket material. The coupling of the diaphragm to the casing is made in the obvious manner by first sandwiching gasket 16 between the mated members and then tightening bolt 14 into position. To further increase the strength, it is preferred first to coat the outer surfaces of gasket 16 with a layer 19 of thermoplastic cement such, for example, as Vulcalock, a registered tradename of B. F. Goodrich Co. for a thermoplastic cement designed particularly for sealing rubber to metal.

When the transducer apparatus is constructed in the manner previously described and installed in the position shown in FIG. 1, it is found to have a number of distinct advantages over previous comparable arrangements. Thus, it provides substantially increased physical strength due to the use of the bolts rather than the flat-head screws. Also, due to the increased thickness of flange, there is added metal to hold the bolts and increase torque and holding strength of the fastening. The straight cylindrical side walls of the bolt heads also improves holding strength. Other advantageous features which have been described relate principally to the flange construction of the diaphragm which both increases the volume of transducer fluid and also disposes the diaphragm in flush relationship with the skin of the hull. In particular, the use of a stainless steel diaphragm materially increases the ability of the transducer to resist shocks and other damaging effects inherent in normal use.

The cover or window formed of the stainless steel has been demonstrated to have a negligible effect on overall transducer performance. For example, tank measurements indicate a transmission loss of only about 0.5 db and a very slight change in impedance. Ships already fitted with transducers having such stainless steel windows have found their operation entirely satisfactory. In fact, certain advantages have been obtained by the use of the stainless steel window. In one particular installation, the stainless steel diaphragm apparently functions as a mechanical filter to remove an undesirable high frequency harmonic of the fundamental operating frequency.

Obviously many modifications and variations of the present invention are possible in the light of the above teachings. It is therefore to be understood that within the scope of the appended claims the invention may be practiced otherwise than as specifically described.

What is claimed is:
1. Sonar transducer apparatus of a type adapted to be mounted in an opening formed in a ship hull, comprising:
   an open-ended tubular casing,
   means supporting said casing in said opening with its open-end edge wall recessed a fixed distance from the skin surface of the hull,
   a transducer diaphragm mounted on said open end wall for closing said casing and extending over a major portion of said hull opening,
   ceramic means carried interiorally of said casing,
   a transducer fluid disposed between and coupling said ceramic means and said diaphragm,
   said diaphragm being formed of a flexibly thin-walled stainless steel plate having a peripheral flange portion projecting inwardly at right angles to the plate,
   said flange portion being disposed for a mating engagement with and abutting said open end edge wall for securing the diaphragm to said casing,
   the flange portion further having a width at least equal to said open end edge wall and a projection of sufficient length both to dispose said diaphragm plate in a flush relationship with said hull skin and to provide clearance space between said ceramic and the diaphragm, the length of the flange being independent of the thickness of said hull skin, and
   means for securing said flange portion to said casing, said means including,
   rubber-like water-tight sealing means disposed between said flange and said open-end edge wall of the casing,
   threaded bolts having radially enlarged cylindrically-shaped bolt heads and,
   lock means for said bolts,
   said flange and casing being provided with openings for receiving said bolts and bolt heads.
2. The apparatus of claim 1 wherein said plate is a flat surfaced member having a thickness of about 3/16 inch.
3. The apparatus of claim 2 wherein said flange portion projection is about 1/2 inch.

References Cited
UNITED STATES PATENTS

| 2,425,594 | 8/1947 | Brown | 340—10 |
| 2,939,106 | 5/1960 | Mason | 340—10 |

RODNEY D. BENNETT, JR., Primary Examiner

B. L. RIBANDO, Assistant Examiner

U.S. Cl. X.R.

340—10